United States Patent [19]

Montgomery

[11] 3,955,729

[45] *May 11, 1976

[54] CARRIER BAG FOR ATTACHMENT TO UPRIGHT HANDLEBARS OF BICYCLE

[75] Inventor: Joseph S. Montgomery, Stamford, Conn.

[73] Assignee: Cannondale Corporation, Stamford, Conn.

[ * ] Notice: The portion of the term of this patent subsequent to May 11, 1993, has been disclaimed.

[22] Filed: Jan. 31, 1975

[21] Appl. No.: 546,017

[52] U.S. Cl. ............................... 224/36; 224/30 A; 224/31; 224/41; 150/28 R; 150/31
[51] Int. Cl.² ...................... B62J 7/06; A45C 13/04
[58] Field of Search ............... 224/36, 35, 33, 32 R, 224/32 A, 30 R, 30 A, 31, 39 R, 41, 42.46 R; 150/28 R, 2.1, 46, 31

[56] References Cited
UNITED STATES PATENTS
3,888,397  6/1975  Koizumi............................... 224/35

FOREIGN PATENTS OR APPLICATIONS
24,828    11/1907  United Kingdom.................. 224/36
140,627   4/1920   United Kingdom.................. 224/36
222,107   9/1942   Switzerland........................... 224/36

Primary Examiner—Robert J. Spar
Assistant Examiner—Jerold M. Forsberg
Attorney, Agent, or Firm—Brumbaugh, Graves, Donohue & Raymond

[57] ABSTRACT

A carrier bag for attachment to a bicycle comprises an enclosure of semi-flexible material and a substantially rigid, three-dimensional frame received within the enclosure, the frame including a pair of spaced-apart legs of generally inverted J-shape positioned in engagement with a back wall and a top wall of the enclosure. A pair of spaced-apart hooks of generally inverted J-shape, each of which is connected to respective spaced-apart legs of the frame, projects exteriorally away from the back of the back wall of the bag in position for engagement of hook portions with upright handlebars of the bicycle. Since the hooks for attaching the bag to the bicycle are attached to the frame, a load in the bag is transmitted into the rigid frame from the enclosure and is, in turn, transmitted from the frame to the handlebars.

5 Claims, 3 Drawing Figures

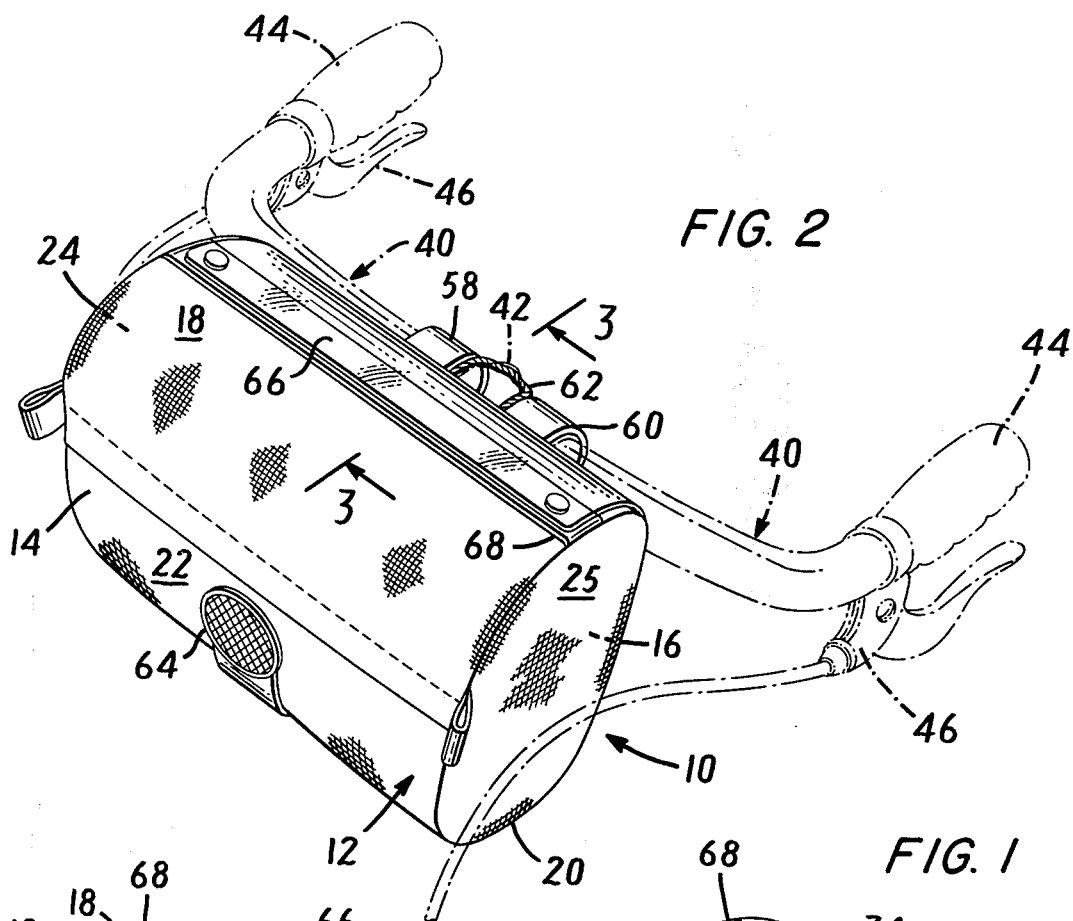
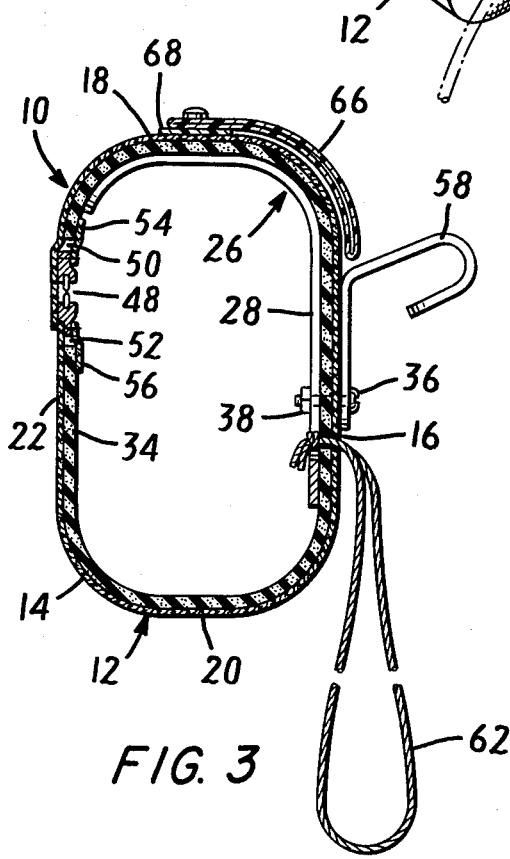
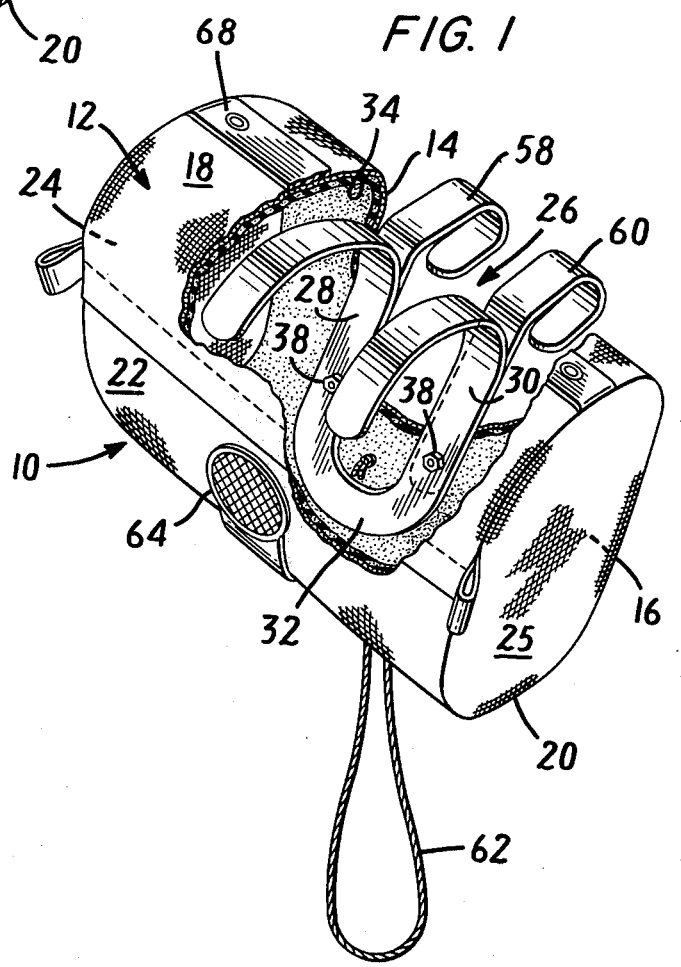

CARRIER BAG FOR ATTACHMENT TO UPRIGHT HANDLEBARS OF BICYCLE

BACKGROUND OF THE INVENTION

This invention relates to lightweight, durable carrier bags for attachment to upright handlebars of a bicycle.

Until recently, the most common way for carrying objects on a bicycle has been to place them in some form of basket mounted on the bicycle, the basket usually being an open, "basket-weave" or gridwork of metal or a plastic or fibrous material. The use of metal, plastic or fiber baskets provided little protection for the objects from the environment, particularly bad weather, so it was often necessary to carefully wrap any objects to be carried in the open types of carrier to ensure that they would not become soiled or wet.

In most cases, the open type carriers have been attached to the handlebars by belts or straps which mount the carrier some distance forward of the handlebars. Also, since the carriers have been of the open type, it was necessary to mount them in a substantially horizontal plane so that objects carried in them would not fall out when the bicycle was riding over rough ground. Because the baskets had to be mounted in a horizontal plane some distance away from the handlebars, a significant torque was applied to the straps or belts such that the carriers tended to swing rather freely from side to side and from front to back, particularly when the bicycle was being maneuvered and the carrier was loaded.

Moreover, the straps or belts for fastening the open types of carrier to the handlebars have been normally attached at the top of the basket. Because the fastening straps or belts are attached near the top wall of the carriers, the carriers hang low from the handlebars. A disadvantage of such a low hung basket is that its overall height is limited to the distance between the handlebars and the front wheel.

SUMMARY OF THE INVENTION

There is provided, in accordance with the present invention, an improvement in lightweight carrier bags for attachment to upright handlebars of a bicycle that significantly increases the size and load carrying capability of the bag and makes it virtually impossible, even under extremely heavy loading, for the bag to sway back and forth and from side to side. More particularly, the improvement involves the provision of a support system for the bag which includes a substantially rigid, three-dimensional frame received within a completely enclosed, and therefore substantially weatherproof, outer enclosure, the frame including a pair of spaced-apart legs of generally inverted J-shape positioned in engagement with a back wall and a top wall of the enclosure. The support system further comprises a pair of spaced-apart hooks of generally inverted J-shape, each of which is connected to respective spaced-apart legs of the frame and projects exteriorly away from the back of the back wall of the bag in position for engagement with the handlebars. Thus, the load in the bag is transmitted from the enclosure to the frame and from the frame to the hooks and from the hooks to the handlebars. Since the load in the enclosure is transmitted through the walls of the enclosure to the top wall, the load generally hangs from the frame.

Another aspect of the present invention relates to an improved way of attaching a carrier bag to the upright handlebars of a bicycle in a manner that ensures that the bag will not sway or otherwise shift position, but will remain stationary. This aspect, which is part of the support system, involves angling the spaced-apart hooks outward away from the back wall of the enclosure to pivot the bag downward and to the rear of the bicycle. To further increase the stability and the load carrying capability of the bag, the frame may be provided with a strip integrally connecting the spaced-apart legs of the frame near the bottom of the rear wall for engaging a downtube of the handlebars when the bag is pivoted downward and to the rear of the bicycle.

Another aspect of the present invention involves attaching a carrier bag to upright handlebars in a manner that enables the size of the bag to be increased. This aspect of the support system involves attaching the spaced-apart hooks, which are located on the outside of the enclosure and are adapted to be attached to the handlebar at the handlebar stem to points on each spaced-apart leg of the frame that are a substantial distance below the top of the bag. By connecting the mounting hooks close to the lower part of each leg of the frame, the top wall of the enclosure is raised to an elevation above the handlebars, thereby increasing the distance between the top wall and the front wheel which, in turn, permits the overall height of the bag to be increased. Also, spacing the hooks a distance apart approximately equal to the width of the handlebar stem permits the handlegrips and other portions of the handlebars to be free of hooks and keeps the bag from shifting transversely. The support system may also include a restraining cord connected to the lower portion of the back wall of the enclosure and adapted to be hooked over the back of the handlebar stem to prevent the bag from swaying or moving forward and outward.

Reference may be made to U.S. Pat. No. 3,903,944 for a description of the enclosure liner and its function in lightweight utility bags. Reference is also made to copending U.S. Patent applications 546,140 and 546,141 filed on Jan. 31, 1975.

DESCRIPTION OF THE DRAWINGS

FIG. 1 is a pictorial view of the bag taken from the front and somewhat above, portions of the enclosure being broken away to show the rigid, three-dimensional frame more clearly;

FIG. 2 is a pictorial view of the bag of FIG. 1 taken from the front and somewhat above; and FIG. 3 is an end cross-sectional view of the bag of FIGS. 1 and 2, the view being taken generally along a plane represented by the lines 3—3 of FIG. 2 and in the direction of the arrows.

DESCRIPTION OF AN EXEMPLARY EMBODIMENT

As shown in FIG. 1, a bag, which is designated generally by the reference numeral 10 in the drawing, comprises an outer enclosure 12 which includes an outer member 14 made of a lightweight nylon fabric coated with polyurethane to render it waterproof and an inner stiffener or liner (described below). The outer member 14 includes a back wall 16, a top wall 18, a bottom wall 20, a front wall 22 and end walls 24 and 25. As shown, the bag 10 is composed of a single main panel of fabric that forms the front, top, bottom and back walls and separate end panels, the respective end panels being stitched around their perimeters to the ends of the main panel of the bag. A protective shape-giving liner 34 of a semi-flexible, resilient compressible polymeric foam is received within the bag 10 in coextensive relation with the front wall 22, top wall 18, back wall 16 and bottom wall 20 of the outer member 14. Reference may be made to U.S. appln. Ser. No. 380,458, filed July 18, 1973, for further description of the liner and its function in lightweight utility bags.

The bag 10 has a support system comprising a substantially rigid, three-dimensional frame 26 made of a strong, preferably lightweight material such as aluminum. The frame includes a pair of spaced-apart legs 28 and 30 which extend generally parallel to each other up the back wall 16 and along the top wall 18 and a crossbar portion 32 which is integral with the legs 28 and 30 and interconnects the legs 28 and 30 near the bottom of the back wall 16. The legs 28 and 30 are fastened to the outer enclosure 12 by screws and nuts 36 and 38. The upper portion of each leg 28 and 30 is curved to conform to the contour of the top wall 18. Therefore, in front and back elevation the frame 26 is U-shaped, while in end elevation the frame 26 is of inverted J-shape. Reference may be made to U.S. Appln. Serial No. 380,458, filed concurrently herewith and entitled "CARRIER BAGS FOR BICYCLES" for a further description of the frame and its function in lightweight utility bags.

The support system also includes a pair of spaced-apart hooks 58 and 60 of generally inverted J-shape that are connected to the lower part of the legs 28 and 30, respectively, by the screws and nuts 36 and 38. The hooks 58 and 60 are adapted to engage the handlebars and may be angled outward away from the back of the back wall so that the bag 10 pivots downward and toward the rear of the bicycle, whereby the crossbar 32 contacts a portion of the bicycle below and to the rear of the handlebars, e.g., the head of the bicycle frame.

As shown in FIG. 2, the bag 10 is constructed to be attached to upright handlebars 40 of a conventional, well-known type that are mounted over the front wheel of a bicycle. Only a portion of the handlebar assembly is illustrated in FIG. 2, namely a stem 42 (shown in phantom) for attaching the handlebars 40 to the bicycle (not shown), handlegrips 44 and brake assemblies 46. Since the hooks 58 and 60 are adapted to engage the handlebars 40, when the hooks 58 and 60 are spaced-apart a distance approximately equal to the width of the tubular handlebar support portion of the handlebar stem 42, other portions of the handlebars 40 are free of the hooks 58 and 60.

An opening for the outer enclosure 12 extends longitudinally along the front wall 22 at a location near the top of the bag 10 and is provided with a zipper closure 48 (see FIG. 3). Pockets 50 and 52 constituted by strips 54 and 56, respectively, of fabric extending longitudinally along the front wall 22 above and below the opening are stitched on the interior of the outer enclosure 12. The liner 34 is retained within the outer enclosure 12 by reception of its respective longitudinal edges within the respective pockets 50 and 52 adjacent the opening to the outer enclosure 12.

The support system may also include a restraining cord 62 connected to the lower portion of the back wall 16 of the bag and adapted to be hooked around the handlebar stem 42 to prevent the bag 10 from swaying or moving forward and outward. Other advantageous features include the provision of a reflector 64 located on the front wall 22 of the outer enclosure 12 and a map case 66 snap-fastened to a strip 68 of webbing (e.g., nylon) which forms a carrier strap for the bag.

The above-described emodiment of the invention is intended to be merely exemplary, and numerous variations and modifications of it will be apparent to those skilled in the art without departing from the spirit and scope of the invention. All such variations and modifications are intended to be included within the scope of the invention as defined in the appended claims.

I claim:

1. A carrier bag for attachment to upright handlebars of a bicycle or the like comprising an outer enclosure of semi-flexible material having a top wall, a bottom wall, left and right end walls and front and back walls defining an enclosed volume;

a substantially rigid, three-dimensional frame member received within the outer enclosure, the frame member including a pair of spaced-apart legs of generally inverted J-shape positioned in engagement with the back wall and the top wall of the enclosure;

a pair of spaced-apart mounting hooks of generally inverted J-shape, each of which is connected to a respective leg of the frame and projects exteriorally away from the back of the back wall of the bag in position for engagement of a hook portion thereof with the handlebars wherein the spaced-apart hooks are adapted to engage the handlebars on either side of the handle bar stem by which the handlebars are connected to the bicycle and wherein the mounting hooks are connected near the lower end of the frame thereby positioning the top wall of the enclosure above the handlebars and the bottom wall above and out of engagement with the front wheel of the bicycle; and a restraining cord connected to the lower portion of the back wall of the enclosure and adapted to be hooked around the handlebar stem to inhibit sway of the bag.

2. A carrier bag according to claim 1 wherein the spaced-apart hooks are angled outward away from the back wall of the enclosure to allow the bag to pivot downward and toward the rear of the bicycle.

3. A carrier bag according to claim 2 wherein the frame member includes a strip connecting the spaced-apart legs of the frame near the bottom of the back wall for contacting the head of the bicycle frame.

4. A carrier bag according to claim 2 wherein the frame member is a single strip of substantially rigid material and is secured to at least the back wall of the enclosure, the connecting strip being joined integrally to the legs such that the frame member is generally U-shaped when viewed from one direction and is generally of inverted J-shape when viewed from a direction oriented 90° with respect to the aforementioned one direction.

5. A carrier bag according to claim 1 wherein the distance between the spaced-apart hooks is substantially equal to the width of a tubular handlebar support portion of the stem.

* * * * *